United States Patent
Laurant

(10) Patent No.: US 10,145,448 B2
(45) Date of Patent: Dec. 4, 2018

(54) ATTACHMENT DEVICE

(71) Applicant: URBAN ASSOCIES ARCHITECTES, Sarzeau (FR)

(72) Inventor: Yves Claire Georges Laurant, Sarzeau (FR)

(73) Assignee: URBAN ASSOCIES ARCHITECTES, Sarzeau (FR)

( * ) Notice: Subject to any disclaimer, the term of this patent is extended or adjusted under 35 U.S.C. 154(b) by 0 days.

(21) Appl. No.: 15/126,563

(22) PCT Filed: Mar. 17, 2015

(86) PCT No.: PCT/EP2015/055564
§ 371 (c)(1),
(2) Date: Sep. 15, 2016

(87) PCT Pub. No.: WO2015/140170
PCT Pub. Date: Sep. 24, 2015

(65) Prior Publication Data
US 2017/0108081 A1    Apr. 20, 2017

(30) Foreign Application Priority Data
Mar. 17, 2014  (FR) .................... 14 52190

(51) Int. Cl.
| *F16G 11/14* | (2006.01) |
| *F16B 2/26* | (2006.01) |
| *D07B 1/18* | (2006.01) |
| *F16G 11/04* | (2006.01) |

(52) U.S. Cl.
CPC ............... *F16G 11/14* (2013.01); *D07B 1/18* (2013.01); *F16B 2/26* (2013.01); *F16G 11/046* (2013.01)

(58) Field of Classification Search
CPC ............. F16G 11/14; D07B 1/18; F16B 2/26
See application file for complete search history.

(56) References Cited

U.S. PATENT DOCUMENTS

| 1,421,026 | A |  | 6/1922 | Regan |  |
| 1,891,947 | A | * | 12/1932 | Powell | F16G 11/14 |
|  |  |  |  |  | 224/258 |
| 2,637,884 | A | * | 5/1953 | Morehouse | A44C 5/22 |
|  |  |  |  |  | 24/115 H |
| 2,832,116 | A | * | 4/1958 | Clevett, Jr. | B65D 63/14 |
|  |  |  |  |  | 24/115 H |

(Continued)

OTHER PUBLICATIONS

International Search Report with English Language Translation, dated May 22, 2015, PCT Application No. PCT/EP2015/055564.

(Continued)

*Primary Examiner* — Robert Sandy
*Assistant Examiner* — David M Upchurch
(74) *Attorney, Agent, or Firm* — Womble Bond Dickinson (US) LLP

(57) ABSTRACT

An attachment device that includes two portions of cord extending from a junction point from which a loop also extends. A locking element brings the portions of cord together at a site other than that of the junction point. The locking element is able to be passed through the loop to close the device on itself and ensure locking. The locking element is also able to slide along the portions of cord, thereby allowing the attachment device to be adjustable.

7 Claims, 4 Drawing Sheets

(56) References Cited

U.S. PATENT DOCUMENTS

| | | | | |
|---|---|---|---|---|
| 2,846,688 A * | 8/1958 | Meeker | A41D 25/022 | 2/150 |
| 2,890,459 A * | 6/1959 | Waterhouse | A41D 25/022 | 2/150 |
| 3,364,500 A * | 1/1968 | Fox | A41D 25/022 | 2/150 |
| 3,453,698 A * | 7/1969 | Mosby | A41D 25/022 | 24/66.1 |
| 3,481,155 A * | 12/1969 | Cook | A44C 11/005 | 24/116 R |
| 3,675,277 A * | 7/1972 | Day | A41D 25/022 | 24/66.9 |
| 3,813,737 A * | 6/1974 | Larsen | A41D 25/022 | 24/129 R |
| 4,049,357 A * | 9/1977 | Hamisch, Jr. | F16G 11/02 | 16/444 |
| 4,854,138 A * | 8/1989 | Charland | E05B 75/00 | 128/878 |
| 4,912,814 A * | 4/1990 | McKenzie | A41D 25/022 | 24/115 H |
| 4,991,339 A * | 2/1991 | Gibson | A01K 91/04 | 24/115 H |
| 5,611,118 A * | 3/1997 | Bibbee | A42B 7/00 | 2/195.1 |
| 5,697,128 A * | 12/1997 | Peregrine | F16G 11/14 | 24/115 G |
| 5,765,227 A * | 6/1998 | Wright | A41D 25/022 | 2/144 |
| 5,896,623 A * | 4/1999 | Martin | F16L 3/233 | 24/115 G |
| 6,389,659 B1 * | 5/2002 | Jacobs | A63C 19/062 | 116/173 |
| 6,880,794 B1 * | 4/2005 | Kahn | A45F 5/02 | 24/115 R |
| 8,757,455 B2 * | 6/2014 | Smalley | A41D 7/00 | 2/67 |
| 9,265,498 B2 * | 2/2016 | Fallin | A61B 17/0401 | |
| 2013/0185900 A1 * | 7/2013 | Campbell | F16G 11/101 | 24/301 |

OTHER PUBLICATIONS

French Search Report with English Language Translation Cover Sheet, dated Nov. 13, 2014, French Application No. 1452190.

\* cited by examiner

ATTACHMENT DEVICE

GENERAL TECHNICAL FIELD

The invention relates to the field of attachment devices, particularly textile shackles, clasps, straps and tensioners.

PRIOR ART

Attachment devices are known from the prior art, particularly textile shackles.

Document FR 2 893 378 describes for example a textile shackle made of tubular braided rope. The shackle comprises at a first end of the rope a loop, and at a second end of the rope a ball formed from two strands of the rope and intended to be inserted into the loop so as to hold the shackle in the clamped position. This shackle applies particularly to the field of rigging.

Another example of a known attachment device is described in document CH 170739. In this document, a shackle is described comprising a rope supplied with a closed loop at a junction point from which extend two elements of rope and of a pin located at the end of one of the rope elements and intended to be inserted in the loop so as to hold the shackle in the clamped position.

However, with such shackles, the distance separating the two parts to be connected depends on the length of the rope and is not adjustable. Such shackles can therefore be adapted only with difficulty to varied conditions of use.

PRESENTATION OF THE INVENTION

In all of the present text, what is meant by a "rope" is any long, flexible strong body and in particular, preferably but not necessarily restrictively, any rope made of natural or synthetic material made by assembling twisted or braided wires.

The present invention relates to an attachment device which does not have the disadvantages of the prior art.

This device comprises:
two rope portions extending from a junction point from which a loop also extends
at least one locking element joining the rope portions at a location different from the junction point,
said locking element being capable of being passed into the loop to close the device on itself and ensure locking.

In addition, its locking element is capable of being slid along the rope portions.

As will be understood easily upon reading what follows, the attachment device proposed has the advantage of being adjustable and, in addition, being inexpensive.

PRESENTATION OF THE FIGURES

Other features, goals and advantages of the invention will be revealed by the description that follows, which is purely illustrative and not limiting, and which must be read with reference to the appended drawings wherein.

DETAILED DESCRIPTION

Principle of the Attachment Device

Figure 1:
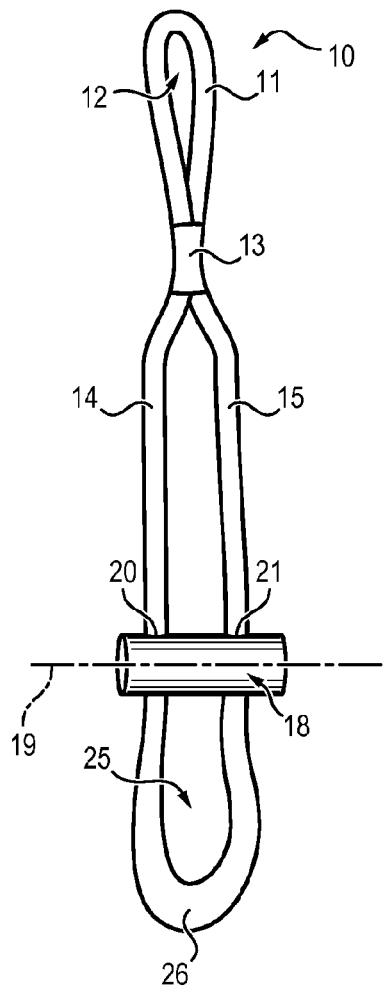
FIG. 1 illustrates an attachment device according to a first embodiment of the invention.
Figure 2:
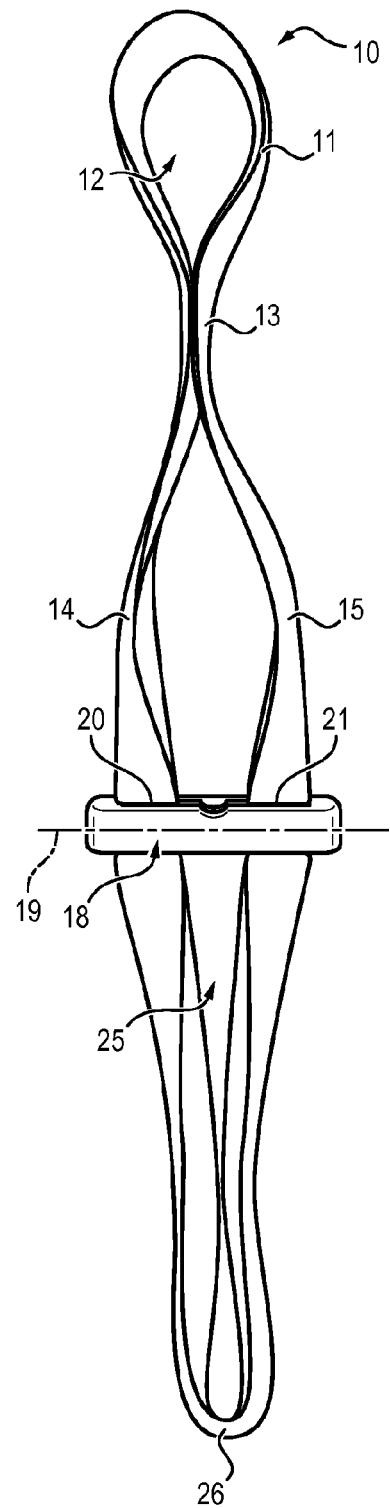
FIG. 2 illustrates an attachment device according to a second embodiment of the invention.
Figure 3:
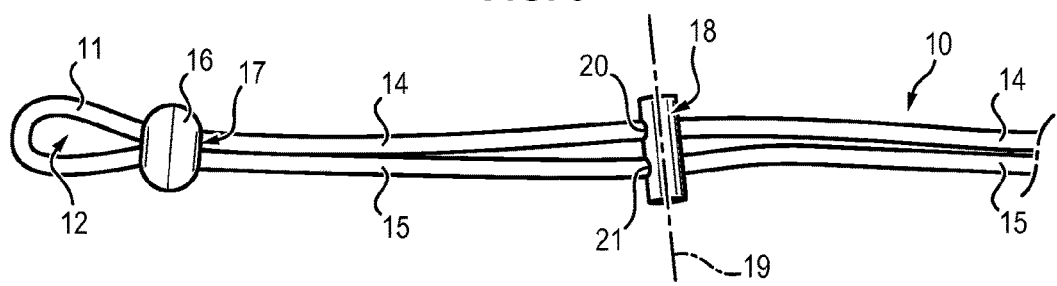
FIG. 3 illustrates an attachment device according to a third embodiment of the invention.

FIGS. 1, 2 and 3 show an attachment device 10 according to different possible embodiments.

The attachment device 10 is mainly formed by a rope 11 and by an adjusting and locking element 18 mounted thereon.

The rope 11 is closed on itself on one side to form a loop 12. On the other side, beyond the junction point 13 on which the loop 12 closes, said rope 11 is extended by two rope portions 14 and 15 joined at the adjustment and locking element 18.

The adjustment and locking element 18 constitutes a locking pin which is intended to be passed into the loop 12 to close the attachment device, so as to use it as a shackle for example.

To this end, this element 18 has for example a cylindrical or "dog-bone" shape and is dimensioned to lock on the loop 12 once said element 18 is passed into said loop 12 (FIG. 4) and the interior of the loop thus formed by the attachment closed on itself is put under tension.

The element 18 also has the peculiarity of being adjustable along the rope portions 14, 15.

To this end, it has two through holes 20, 21 respectively receiving one and the other of the two rope portions 14, 15.

These openings 20, 21 are for example parallel to one another. They are formed and dimensioned so as to allow a user to cause the element 18 to slide on the rope portions 14 and 15. The element 18 can slide along the rope portions 14, 15 whether the attachment device 10 is closed on itself and under tension, or not.

In this way, the closing loop of the device 10 is adjustable, and the attachment device 10 can therefore easily adapt to various conditions of use.

Examples of Materials—Details of Construction

The rope 11 can be made of any type of material.

It is for example made of a rope of hollow fibres or of vegetable fibres. This rope can also comprise metal fibres.

The rope 11 can further be made of materials comprising natural or synthetic rubber, leather or plastic, or perhaps metal portions.

It can have a circular section or have the shape of a ribbon.

Thus the rope 11 and the rope portions 14, 15 can also be a strap, a cable, a belt or a tensioner, also called a "sandow."

The adjustment and locking element 18 can also be made of different types of materials, for example of wood, bamboo, aluminium, aluminium alloy, steel, stainless steel, plastic, polyester or carbon rods or battens, brass, copper, bronze, etc.

It can also have different types of shape and is preferably elongated.

It can for example be of circular section, other sections naturally being possible (triangular, rectangular, square, . . . ).

The attachment device 10 can also comprise several adjustment and locking elements 18 mounted in series on the rope portions 14, 15.

Its openings 20, 21 are perpendicular to the main axis 19 along which it extends. The openings 20, 21 are preferably of a shape complementary to the rope portions 14, 15. The openings 20, 21 have for example a circular, square, rectangular etc. section. The openings 20, 21 can also have a generally frusto-conical profile, so as to block the sliding of the rope portions 14, 15 in one direction. The dimensions of the section of the openings 20, 21 are preferably less than or equal to the dimensions of the section of the rope portions 14, 15 unloaded. What is meant by "unloaded" is an unconstrained state of the rope portions 14, 15. When the rope portions 14, 15 have a circular section, the openings 20, 21 are assembled and spaced with a distance between axes less than or equal to the sum of the diameters of the rope portions 14, 15, so that loads are well distributed over the rope portions 14, 15. When the rope portions 14, 15 have the shape of a ribbon, the openings 20, 21 are assembled and spaced with a distance between axes greater than the sum of the thickness of the rope portions 14, 15. The junction point 13 of the first loop 12 is for example formed by ropework, by splicing, by braiding, by crimping, by gluing, by welding or by cutting out etc., the loop 12 and the rope portions 14, 15 being formed in a single piece, by the same rope 11 or being formed by several distinct rope elements. Preferably, the first loop 12 has a diameter less than or equal to the extension of the adjustment and locking element 18, so as to avoid the first loop 12 disengaging from the adjustment and locking element 18.

Moreover, as illustrated in FIG. 3, the attachment device 10 can comprise at the junction point 13 a junction element 16, which provides for the closure of the loop 12 on itself and which includes an opening 17 accommodating the two rope branches joined at said junction point 13. This junction element 16 allows sliding of the rope branches and consequently allows the adjustment of the loop 12. The opening 17 of the junction element 16 has for example a circular section. In this case, the diameter of the opening 17 is preferably less than or equal to the sum of the diameters of the rope 11 unloaded. The rope 11 has for example at the loop 12 excess thickness configured to prevent the junction element 16 from sliding along the rope 11 until it is extracted therefrom.

Also, at their end opposite to the junction point 13, the two rope branches which constitute the portions 14 and 15 are closed one over the other, either they are in a single piece from the junction point 13 to itself as illustrated in FIG. 1, or they are connected at a junction zone 26.

In both cases, the loop 25 thus formed makes it possible to avoid the adjustment and locking element 18 disengaging from the rope branches and detaching itself from the attachment device 10. The loop 25 can also be used to form particular knots.

The connection at this junction zone 26 is for example carried out by sewing, by welding, by gluing by means of a sleeve of heat-shrinking material, by hot-melt, by clamping, by crimping or by ropework.

The rope branches can also extend beyond this junction zone 26 and be joined a little farther, to thus form together a new loop similar to the loop 12, thus offering several possibilities for use to a user. Assuming this for example, the attachment device 10 can then comprise several locking and adjustment elements.

Examples of Use

Figure 4:
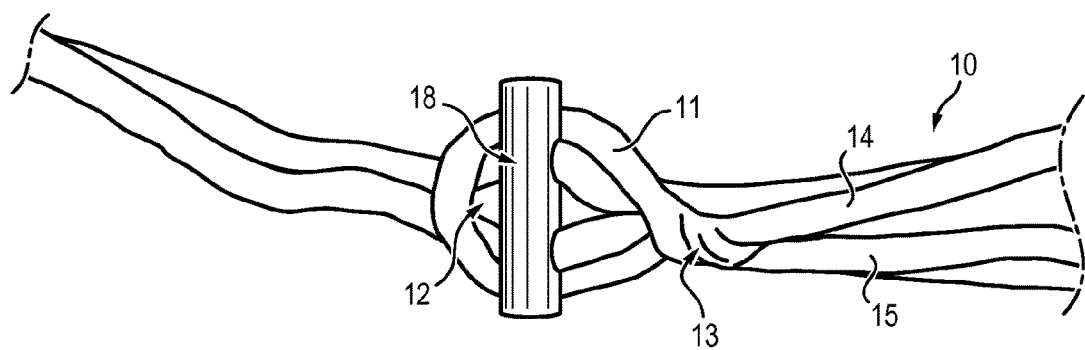
FIG. 4 illustrates the formation of a simple knot by means of an attachment device according to one embodiment of the invention.

FIG. 4, already discussed, gives a first example of use of an attachment device of the type of those which were just described.

Figure 5A:
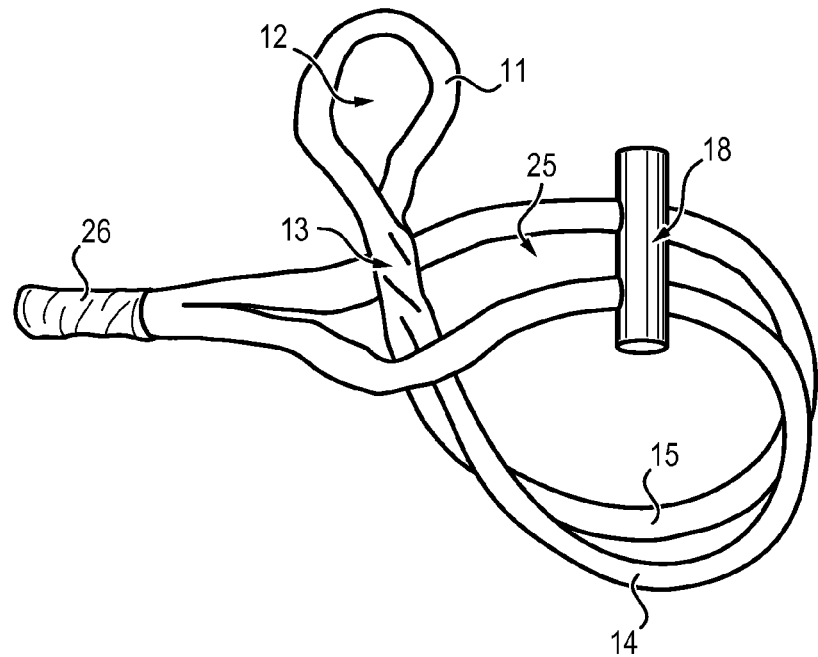
FIGS. 5a and 5b illustrate the formation of a double knot by means of an attachment device according to one embodiment of the invention.
Figure 5B:
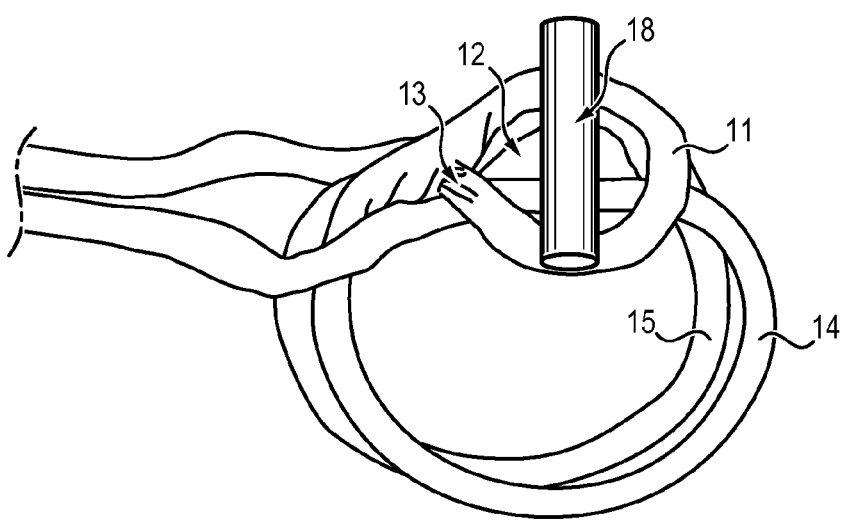

FIGS. 5a and 5b, for their part, illustrate the formation of a double knot. To form this double knot, the loop 12 and the portions 14, 15 closed by the locking element 18 are wrapped so that the first loop 12 is passed into the loop 25. The loop 12 is then again passed over the locking element 18.

Figure 6A:
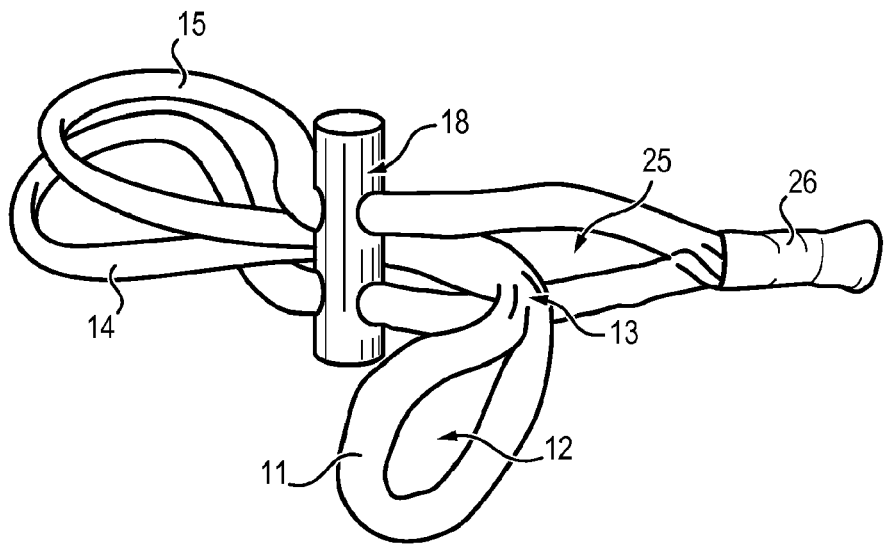
FIGS. 6a and 6b illustrate the formation of a self-locking know by means of an attachment device according to one embodiment of the invention.
Figure 6B:
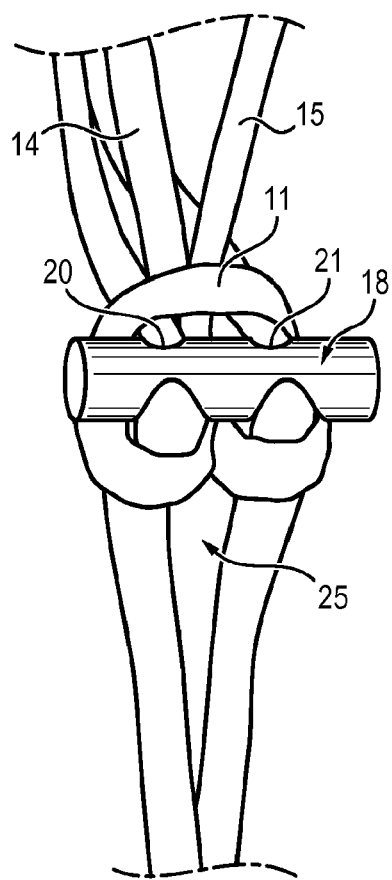

FIGS. 6a and 6b, for their part, illustrate the formation of a self-locking knot. To form this self-locking knot, the portions 14, 15 closed by the locking element 18 are wrapped so that the first loop 12 is passed on the one hand between the portions 14 and 15, then into the loop 25. The loop 12 is then passed over the locking element 18. Such a self-locking knot prevents any sliding of the locking element 18, even under heavy load.

In each of the examples of use described earlier, it is shear applied by the first loop 12 to the rope portions 14, 15 which ensures the locking of the device 10 when the device 10 is under tension.

The attachment device 10 which was just described can be assembled to a friction ring, to a fixed or opening pulley, so as to form a hoist. Such a hoist can for example be used in the nautical field or the construction industry.

It can in particular be used in the nautical field, for example as a shackle or as an attachment device intended to be assembled to an existing metal shackle.

It can also serve as a clasp for clothing, a belt, jewelry, bags, etc.

The attachment device 10 can further be used in the medical field, for example as a ligature.

The invention claimed is:

1. An attachment device (10) comprising:
   two rope portions (14, 15) extending from one side of a junction point (13) from which a loop (12) also extends, said loop extending at the other side of said junction point,
   a locking element (18) joining the rope portions at a location different from the junction point,
   the loop and said locking element being dimensioned such that the locking element when passed into the loop, closes the attachment device on itself and such that said locking element ensures locking when an interior of a closing loop thus formed by the attachment device closed on itself is put under tension;
   a junction element (16) which provides for the closure of the loop (12) on itself, said junction element including at least one opening (17) accommodating the two rope portions (14, 15) joined at said junction point (13) and allowing the sliding of the rope portions for adjusting said loop;
   wherein said locking element is slidable along the rope portions, the closing loop formed by the attachment device thus being adjustable;
   wherein the loop (12) and the rope portions (14, 15) are made in a single piece, by the same rope (11).

2. The device (10) according to claim 1, wherein the locking element (18) includes two through openings (20, 21) respectively receiving one and the other of the two rope portions (14, 15), these openings being formed and dimensioned so as to allow sliding of the locking element on the rope portions.

3. An attachment device (10) comprising:
   two rope portions (14, 15) extending from one side of a junction point (13) from which a loop (12) also extends, said loop extending at the other side of said junction point,
   a locking element (18) joining the rope portions at a location different from the junction point,
   the loop and said locking element being dimensioned such that the locking element when passed into the loop, closes the attachment device on itself and such that said locking element ensures locking when an interior of a closing loop thus formed by the attachment device closed on itself is put under tension;

wherein said locking element is slidable along the rope portions, the closing loop formed by the attachment device thus being adjustable;

wherein, at their end opposite to the junction point (13), the two rope portions (14, 15) are closed one over the other.

4. The device (10) according to claim 3, wherein the rope portions (14, 15) are in a single piece.

5. The device (10) according to claim 3, wherein the rope portions (14, 15) are interconnected at a second junction zone (26).

6. The device according to claim 5, wherein the rope portions (14, 15) extend beyond this second junction zone and are joined farther to form together a supplementary loop (25).

7. Use of an attachment device (10) according to claim 1, wherein the locking element is passed into the loop extending from the junction point;

the locking element is slid along the rope portions to adjust the closing loop formed by the attachment device and put the interior under tension, said locking element being locked on the loop extending from the junction point and thus ensuring locking of the attachment device when said attachment device is under tension.

* * * * *